United States Patent Office 3,141,777
Patented July 21, 1964

3,141,777
TREATMENT OF SOYBEANS
Elio J. Guidarelli, Minneapolis, Russell A. Eversole, Excelsior, and James F. Lawrence, Minneapolis, Minn., assignors to Cargill Incorporated, Wilmington, Del., a corporation of Delaware
No Drawing. Filed Oct. 11, 1961, Ser. No. 144,503
3 Claims. (Cl. 99—98)

The present invention generally relates to the treatment of soybeans, and more particularly, it relates to a simple, inexpensive method of effectively treating soybeans which contain their naturally occurring fat to improve the edibility and palatibility thereof.

Soybeans are a well-balanced source of nutrients for both humans and animals, the amino acid composition of the soybean proteins being of particularly high quality nutritionally, comparing favorably with animal sources of protein. However, the extent of use of soybeans in human foods, animal feeds and the like is far less than is suggested by the availability, low cost and nutritional quality of the soybean.

In this connection, raw soybeans have an undesirable raw beany flavor. Moreover, certain inhibitory and toxic factors are present in raw soybeans which deleteriously influence their edibility. It has been found that such factors can be destroyed by the application of heat. However, application of a sufficient amount of heat to accomplish this destruction of toxic and inhibitory factors has usually resulted in a substantial depreciation of the value of the soybean.

Thus, the proteins of the soybeans may undergo undesirable modifications upon extended conventional heating. In this regard, the dispersibility of the soybean protein, a measure of the digestibility of the proteins, is reduced to a substantial extent. The dispersibility is measured in the following manner:

The soybeans are ground so that at least 96 percent thereof pass through a 100 mesh screen. Four grams of ground soybeans and 100 ml. of water are placed in a 250 ml. centrifuge bottle and shaken in a mechanical shaker for 30 minutes at room temperature (24° C. to 26° C.). The dispersion is then clarified by centrifuging for 6 minutes. One or more 25 ml. aliquots of the supernatant are then removed and conventional Kjeldahl nitrogen determination tests are run thereon. A similar test is run on a sample of the unextracted ground soybeans. The percentage of water dispersed nitrogen is then calculated from the test results on the basis of the total nitrogen in the ground soybeans. No correction is made for moisture. A detailed description is set forth in an article in Industrial and Engineering Chemistry, vol. 30, pp. 1414–1418, 1938.

Thus, when the water-solubility of the nitrogenous constituents in the soybean decreases, i.e., a lowered dispersibility value, less of the total protein in the soybeans is readily available for nutrition upon ingestion of the soybeans. Accordingly, the nutritional quality of the soybeans can be said to depreciate.

Techniques have been developed for otherwise utilizing soybeans. It has been found that the oil of the soybean can be extracted and it is an item of commerce. The soybean meal remaining after oil extraction is usually utilized as an animal feed. In the bean processing, the toxic and inhibitory factors are rendered ineffectual but the dispersibility of the protein is substantially reduced.

It would be advantageous, however, to provide a method whereby soybeans before fat removal, that is soybeans prior to oil extraction, could be effectively and inexpensively processed to provide high quality food products. Such a method would have to minimize the inhibitory and toxic factors in the soybeans while not impairing the nutritional properties of the soybean. It would, of course, be desirable to substantially improve the palatability of the soybean in the practice of the method.

Such a method has now been discovered. The method is easily practiced, economical, does not require complicated processing equipment and is relatively rapid. It provides a high quality soybean product which has improved edibility and palatability, and, accordingly, has improved utility as a food and feed product.

Accordingly, it is a principal object of the present invention to provide soybeans, containing their naturally occurring oil, having improved edibility and palatability. It is also an object of the present invention to provide a method of treating harvested soybeans to improve their edibility by reducing the concentration of toxic and inhibitory factors therein and to improve their palatability.

It is a further object of the present invention to provide a readily practiced, economical, and relatively rapid method of treating soybeans to convert them into a high quality edible product. It is a still further object of the present invention to provide a method whereby destruction of inhibitory and toxic factors can be carried out in soybeans without substantially depreciating the digestibility or nutritional value of the soybean. It is also an object to provide a method which produces soybeans having a desirable taste and aroma and, accordingly, have improved palatability.

Further objects and advantages of the present invention will be apparent from a study of the following detailed description.

The present invention, therefore, generally comprises a method of treating soybeans, particularly soybeans as harvested and containing their naturally occurring oil, to improve the utility thereof as a food. The soybean as harvested or ground without fat removal may be referred to herein as "full fat soybeans." This is accomplished by heat treating the soybeans with infra-red radiation for a controlled period of time at a specified temperature and moisture content.

More particularly, the method comprises adjusting, if necessary, the moisture content of the soybeans by a tempering step, then heating the soybeans to a critical temperature range in a manner which does not depreciate the dispersibility of the soybean protein. The heating is carried out through the use of infra-red radiation acting in combination with the controlled moisture in the soybeans. The moisture concentration in the soybeans is maintained above a critical level. Thereafter, the soybeans are cooled and may be subjected, if desired, to additional processing steps, such as cracking, dehulling, grinding or milling, flaking, and oil extraction.

Now referring more particularly to the steps of the method of the present invention, soybeans of any desired type can be treated in accordance with the present method. Preferably, full fat soybeans which have not been subjected to oil extraction are utilized. However, soybeans from which soybean oil has been removed can be used. The soybeans may be whole, cracked, dehulled, ground, flaked or in any other physical condition.

The soybeans are subjected to a moisture-adjusting or tempering step, if their initial moisture concentration is not already within the desired range. In this regard, the soybeans can be mixed with an appropriate quantity of water to adjust the moisture content in the soybeans to within the range of from about 8 percent to about 27 percent, by weight. Preferably, the moisture content in the soybeans is adjusted to between about 19 percent and about 22 percent, by weight. In order to assure that the moisture has been absorbed uniformly throughout the soybeans, the beans are allowed to stand for a period of several hours until the moisture has substantially equilibrated throuhgout the soybeans. It will be understood that water contacting of the soybeans is not carried out in a manner which results in removal of constituents from the soybeans. The sum total of the tempering step is that water is added to the soybeans.

For some uses of the soybeans, it is desirable to maintain the moisture for at least about two hours after uniform distribution of moisture to permit enzymatic action to occur within the soybeans which enhances feed efficiency in some instances. Of course, the soybeans should not be held for such period as would result in substantial mold or yeast growth, or such period as would otherwise deleteriously affect the soybeans.

It has been found that it is very important that the soybeans be within the indicated moisture range before heat treatment thereof, in order to achieve the desired results. When insufficient moisture is present in the soybeans during infra-red radiation, the beans have a tendency to undergo protein modification. Overheating of the soybeans may occur before destruction of toxic and inhibitory factors is accomplished. However, when sufficient moisture is present in the soybeans, the moisture protects the soybeans from overheating and from undergoing any substantial protein modification. The heating, however, is sufficiently prolonged and intense so as to destroy the inhibiting and toxic factors.

In accordance with the present invention, soybeans having a moisture content within the indicated range are treated by subjecting them to infra-red radiation at a controlled temperature for a period of time sufficient not only to destroy the inhibiting and toxic factors in the soybeans, but also to improve the flavor in the beans without deleteriously affecting the nutritional and biological value of the soybeans. During the radiation, the moisture content of the beans tends to decrease. The extent and degree of infra-red radiation carried out on the soybeans is regulated so that the total moisture content of the beans during the radiation is not reduced to below 7 percent, by weight. This is important in order to preserve the nutritional value and edibility of the beans.

Infra-red radiation offers a two-fold increase in the rate of drying, which is more effective drying because it permits drying without over-heating the non-aqueous soybean constituents, and thereby substantially preserves the nutritional value and lessens the decrease in protein dispersibility. The effect here is to a much greater extent than with other conventional methods of heating. Water has a higher specific absorption of the infra-red radiation than do the other soybean ingredients. Therefore, water evaporation takes place even though the soybean nutrients are not heated as much as is necessary in conventional drying processes.

The infra-red radiation can be carried out utilizing any suitable equipment. However, it has been found that gas burners designed to most effectively emit infra-red radiation at wave lengths most effectively absorbed by water are the most desired sources of radiation, inasmuch as they are inexpensive to operate relative to the amount of energy transferred. It has further been found that an infra-red radiation source which peaks at between about 2 and about 6 microns is satisfactory, and that which peaks at about 3 microns is preferred.

The radiation is preferably carried out by passing the soybeans in a layer two to four beans thick on a conveyor into contact with the radiation. Utilizing a Swank ceramic grid as a source of radiation and operating at a surface temperature of approximately 1500 degrees F., approximately 55 percent of the gas energy is converted to infra-red radiation in the wave length region of between 2 and 6 microns. The energy from the infra-red radiation source is transferred directly to the soybeans without substantially heating the intervening air, and, accordingly, infra-red heat treatment is very efficient. The radiant energy absorbed by the soybeans is transformed substantially uniformly in the beans into thermal energy. The heat generated in the moisture-containing soybeans has the desired effect of improving the edibility and palatability of the soybeans.

It has been found that the heat treating temperature at the level of the beans should be at least about 200 degrees F., preferably at least about 205 degrees F., and may be as high as 270 degrees F. The preferred temperature range is between about 230 degrees F. and about 245 degrees F.

The temperature time necessary to effect desired results will depend upon the particular treating temperature or temperatures. Thus, for example, when the soybeans immediately before heat treating have a moisture content of about 30 percent, the beans can be effectively heated from about room temperature (70 degrees F.) to a temperature of about 205 degrees F. and maintained at that temperature for a total treatment time of about 15 minutes to bring about the desired results.

If the temperature is raised to 245 degrees F. through the use of infra-red radiation, the treatment time at a 30 percent moisture content for the soybeans need only be about 6 minutes. The treatment time should be reduced further if the moisture content of the bean is further reduced. In this regard, at a treatment temperature of 245 degrees F., the treating time need only be about 4 minutes where the moisture content of the soybeans immediately before treatment is about 20 percent. Thus, for most purposes, a treating time between about 4 and 15 minutes is suitable, depending on the temperature achieved and moisture content of the soybeans.

During the heat treatment, the initial moisture content of the beans which had been adjusted to a concentration between about 8 and about 27 percent, by weight, is reduced, but is maintained at not less than about 7 percent, by weight, and preferably between about 10 and 12 percent, by weight.

The infra-red heat treatment is carried out in a manner to achieve a number of important effects. In this connection, the heat treatment destroys trypsin inhibitors in the soybeans. It also has the effect of inhibiting soyin, a naturally occurring toxic protein in the soybeans. Moreover, the urease activity of the soybeans is reduced to a level whereby the Caskey Urease Test indicates a slight activity or no activity (briefly described on p. 279, Soybeans and Soybean Products—Markley, vol. 1). Briefly, in the Caskey Urease Test, 0.2 g. of the ground soybean is added to 10 ml. 0.05 M. phosphate buffer solution at pH 7.0, the solution also containing 0.3 g. urea and 2 drops of 1 percent phenol red solution. The mixture is allowed to stand at 25 to 30 degrees C. for 30 minutes, with occasional agitation. The presence of urease is detected by an increase in pH of the solution (change in color of the indicator). An increase in pH of 1 unit changes the indicator to deep red. Slight urease activity is indicated by a slight increase in the depth of color in the indicator.

The Caskey Urease Test is described in detail in The Association of Official Agricultural Chemists, vol. 30, No. 2, pp. 354–364. Accordingly, the infra-red heat treatment results in an increase in the edibility of the soybeans.

In addition, the infra-red heat treatment has the effect of imparting to the soybean a toasted or roasted "nut-like" flavor. Factors which cause the soybeans to have an undesirable beany flavor are modified. Accordingly, the palatability of the soybeans is improved. These effects are achieved without substantial reduction in the protein dispersibility of the soybeans. Dispersibility of the treated soybeans is at least 55 percent, in contrast to a value of about 10 percent for conventionally treated soybean meal. A high protein dispersibility is a desirable feature, as previously indicated, whenever the soybeans are to be used as or incorporated in livestock feed or other food products.

Following the infra-red radiation heat treatment step, the beans are cooled. Further processing steps can be employed before, during or after cooling, as desired. In this connection, the beans can be cracked, dehulled, ground, etc. hot, warm or cold. It has been found that the cracking and dehulling operation can be more efficiently accomplished after the heat treatment step than before such step. Thus, it is easier to crack and dehull heat treated beans than raw beans. Grinding, flaking and similar comminuting operations can be carried out to increase the availability of soybean oil when the product is fed to humans or animals and to make the blending of the soybeans with other ingredients in the preparation of foods and feeds much easier.

Such cooling operation, dehulling, cracking, grinding, flaking and similar operations can be carried out on conventional equipment, in accordance with well-known procedures applied to types of feed, etc. Accordingly, a finished soybean product having improved edibility and palatability is provided. Livestock feeds made from the product of the present method show definite increases in feeding efficiency and production efficiency, in comparison with commercial feeds utilizing other forms of soybean products.

It has been found that comminuted soybeans treated in accordance with the method of the present invention can be stored over longer periods of time without substantial flavor reversion or development of oxidative rancidity when a small amount of an antioxidant is added thereto. It has further been found that sesame oil has an unexpectedly increased efficiency in preserving the storage stability of the treated soybean. Thus, sesame oil not only stabilizes the oxidizable portions of the soybean oil in the product, but also in itself is a natural food and imparts a very appealing flavor to the soybean product. Usually only very small quantities of the sesame oil are necessary in order to achieve the desired results. For example, it has been found that sesame oil in a concentration of from about 1 to about 10 percent, by weight, of the soybean oil in the product, is sufficient to improve the storage stability of the soybean product. A sesame oil concentration of approximately 2 percent, by weight, of the soybean oil is sufficient for the same purposes.

Further features of the present invention are set forth in the following examples:

*Example I*

Full fat soybeans having a moisture concentration of about 7 percent are soaked in water for a sufficient period of time to increase the moisture content to approximately 19 percent by weight. The beans are allowed to temper for a sufficient period of time so that the 19 percent, by weight, moisture concentration is uniformly distributed therethrough. The moist beans are then passed on a conveyor in a layer not more than about 2 beans thick into the path of infra-red radiation emanating from a gas burner type infra-red ceramic grid operating at about 1650 degrees F. surface temperature. The beans are held in the beam path for a period of approximately 4 minutes during which time they increase in temperature to approximately 245 degrees F. At the end of the heat treating period, the beans are passed by conveyor out of contact with the infra-red radiation and between cracking rolls. They then pass to a dehulling operation. After dehulling, the beans are ground to meal and sesame oil is blended therewith in a concentration of approximately 2 percent, by weight, of the soybean oil content in the meal.

The thus prepared soybean meal, is then incorporated in a broiler feed for chickens and subjected to poultry feeding tests, in comparison with conventional feed containing an identical concentration of soybean meal prepared by steps including dehulling, grinding, extraction of soybean oil and steam treatment of the soybean meal at elevated pressure. The soybean product prepared in accordance with the present invention produced superior results in contrast to the conventional feed, in terms of increased weight per pound of feed. In addition, the present soybean product has a toasty nut-like flavor and aroma, an inactive urease level, as determined by a Caskey Urease Test, and a substantially nil soyin concentration. The soybean product has 55 percent protein dispersibility. Storage stability tests on the soybean product after addition thereto of sesame oil at a level of 2 percent of the soybean oil content indicate that the product can be held for extended periods of time without undergoing substantial flavor reversion or oxidation of the soybean oil content thereof.

*Example II*

Full fat soybeans are processed in accordance with the method of Example I, except that the initial moisture concentration of the soybeans is about 8 percent, by weight, and the moisture concentration is increased by an optional tempering step to a concentration of approximately 30 percent, by weight. Infra-red heat treatment is carried out on the soybeans utilizing infra-red radiation having about 4 microns peak wave length, the soybeans reaching a temperature of approximately 200 degrees F. The total infra-red treatment time is about 15 minutes. At the end thereof, the moisture content of the product has fallen to approximately 12 percent, by weight. The infra-red heat treated product is then passed to cracking and dehulling equipment and, after dehulling, is flaked and utilized in animal feed tests in combination with standard animal feed ingredients.

The soybean product is comparable to the improved soybean product set forth in Example I, both with respect to increased edibility and enhanced palatability. Moreover, the soybean product is superior in nutritional value, digestibility and palatability to soybean products prepared by steam treating at atmospheric pressure or elevated pressure for a sufficient length of time to inhibit toxic and inhibitory factors in the soybean meal. Steam treatment of soybean oil-containing meal tends to bring about a decrease in the protein dispersibility, i.e., digestibility of the protein.

*Example III*

Soybeans are treated in accordance with the method set forth in Examples I and II, except that the moisture content thereof immediately before infra-red heat treatment is 20 to 25 percent, by weight, and the temperature during heat treating is 235 degrees F., maintained for 6 minutes. The moisture content of the soybeans is reduced to 12 percent, by weight, during the heat treatment. The soybean product has properties comparable in every respect to those specified for the soybean product set forth in Examples I and II.

*Example IV*

Soybeans are treated in accordance with the method set forth in Example III, except that the moist soybeans, after uniform distribution of moisture through the soybeans, are held for 16 hours prior to the infra-red heat treatment. This results in the enzymes naturally occurring within the soybeans acting upon the protein which results in enhanced feed efficiency when the resulting product is fed to chickens.

The method of the present invention results in a high quality soybean product which has improved utility in human and animal feeds by reason of its high nutritional value, easy digestibility, improved flavor and aroma and absence of toxic substances and the like. The product has a long storage life. Moreover, the method can be carried out on a commercial basis with considerable economy, simplicity and speed of production. Other advantages of the present invention are set forth in the foregoing.

Various of the features of the present invention are set forth in the following claims.

What is claimed is:

1. A method of improving the edibility and palatability of soybeans, which method comprises the steps of subjecting soybeans having a moisture content of between about 8 and about 30 percent by weight, to a heat treatment with infra-red radiation at a temperature of about 200° F. to about 270° F. for about 15 minutes to about 4 minutes, terminating said heat treatment before the moisture concentration of said soybeans falls below about 7 percent by weight, and thereafter cooling said soybeans, whereby soybeans having improved edibility and palatability, including a toasted nut-like flavor, are provided.

2. A method of improving the edibility and palatability of full fat soybeans, which method comprises the steps of adjusting the moisture concentration substantially throughout full fat soybeans to a concentration of between about 19 and about 22 percent by weight, maintaining said adjusted moisture content for at least about 2 hours, thereafter subjecting said soybeans to a heat treatment with infra-red radiation at a temperature of between about 205° F. and about 270° F. for about 15 minutes to about 4 minutes to destroy toxic and inhibitory factors in said soybeans and to increase the palatability of said soybeans, terminating said heat treatment before the moisture content in said soybeans falls to below about 7 percent by weight, and thereafter cooling said soybeans, whereby improved full fat soybeans having improved digestibility and palatability, including a toasted nut-like flavor, are provided.

3. A method of improving the edibility and palatability of full fat soybeans, which method comprises the steps of adjusting the moisture content of full fat soybeans to between about 19 and about 22 percent by weight, substantially throughout said soybeans, maintaining said adjusted moisture content for at least about 2 hours, subjecting said soybeans to a heat treatment with infra-red radiation having a peak wave length of between about 2 and about 6 microns, at a temperature between about 230° F. and about 245° F. for between about 6 minutes and about 4 minutes to destroy toxic and inhibitory factors in said soybeans and increase the palatability of said soybeans, and terminating said heat treatment before the moisture concentration of said soybeans falls below about 10 to 12 percent by weight, whereby an improved soybean product having increased edibility and palatability, including a toasted nut-like flavor, is provided.

References Cited in the file of this patent

UNITED STATES PATENTS

| | | |
|---|---|---|
| 2,069,265 | Musher | Feb. 2, 1937 |
| 2,117,315 | Gossel | May 17, 1938 |
| 2,410,427 | Chappell | Nov. 5, 1946 |

UNITED STATES PATENT OFFICE
Certificate

Patent No. 3,141,777                        Patented July 21, 1964

Elio J. Guidarelli, Russell A. Eversole and James F. Lawrence

Application having been made by Elio J. Guidarelli, Russell A. Eversole and James F. Lawrence, the inventors named in the patent above identified; and S. Cargill Incorporated, Wilmington, Delaware, a corporation of Delaware, the assignee, for the issuance of a certificate under the provisions of Title 35, Section 256 of the United States Code, deleting the name of the said Russell A. Eversole as a joint inventor, and a showing and proof of facts satisfying the requirements of the said section having been submitted, it is this 5th day of November 1968, certified that the name of the said Russell A. Eversole is hereby deleted from the said patent as a joint inventor with the said Elio J. Guidarelli and James F. Lawrence.

EDWIN L. REYNOLDS,
*First Assistant Commissioner.*

[SEAL]